United States Patent Office 2,893,966
Patented July 7, 1959

2,893,966

RESIN COMPOSITIONS CONTAINING TRICARBOXYLIC OXY-ACIDS

Sylvan O. Greenlee, Racine, Wis., assignor to S. C. Johnson & Son, Inc., Racine, Wis.

No Drawing. Application November 7, 1956
Serial No. 620,816

10 Claims. (Cl. 260—19)

This invention relates to new products and compositions resulting from the reaction of polyepoxides with tricarboxylic acids, and said compositions modified with condensates of aldehydes and ammonia derivatives, or condensates of aldehydes and phenols, in regulated proportions to produce valuable compositions useful in the manufacture of varnishes, molding compositions, adhesives, films, molded articles, etc. The invention includes initial reaction mixtures or compositions as well as intermediate and final reaction products and methods for their production.

It is an object of this invention to produce new compositions of matter from suitable proportions of tricarboxylic acids and polyepoxides or said compositions modified with aldehyde condensates, which are suitable for use in coating compositions, molding compositions, adhesives, etc.

Another object of this invention is the production of reaction mixtures of the aforesaid epoxides and tricarboxylic acids or said reaction mixtures modified with aldehyde condensates which are capable of reaction on the application of heat to form infusible, insoluble products.

Another object of this invention is the production of new reaction mixtures, as described above, which are stable at ordinary temperatures for long periods of time and which may be converted to insoluble, infusible products by the application of heat with or without the addition of catalyst.

Another object of this invention is to provide for the production of co-conversion products of polyepoxides and particular tricarboxylic acids or said products modified with aldehyde condensates, with such co-conversion products being characterized by extreme hardness, flexibility, and resistance to water, alkali, and organic solvents.

Other objects of the invention will appear from the following more detailed description with particular reference to the illustrative examples.

In general, the epoxides contemplated for use with the tricarboxylic acids to prepare the compositions of this invention are compounds containing an average of more than one, up to about twenty epoxide groups, per molecule. Such compounds, free from functional groups other than epoxide, carboxyl, and hydroxyl groups, are reactive with active hydrogen-containing groups such as the carboxyl groups supplied by the tricarboxylic acids herein contemplated. Typical epoxides which have been found to be operable are complex resinous polyepoxides, resinous polyepoxide polyesters, epoxidized natural oils, and simple aliphatic polyepoxides.

The reaction products of this invention are prepared by esterifying the epoxide groups with tricarboxylic organic acids, which are derivatives of a bis(arylene)-substituted aliphatic acid and modifying said compositions with aldehyde condensates.

The tricarboxylic acids suitable for use with the polyepoxides in preparing the reaction mixtures and co-conversion products of this invention are described in detail in the copending Greenlee application S.N. 603,247, filed August 10, 1956, entitled "Tricarboxylic Acids." They are prepared, for example, by heating a bis(hydroxyaryl)-substituted aliphatic acid with a substituted carboxylic aliphatic acid capable of forming an ether linkage with phenolic hydroxyl groups.

The bis(hydroxyaryl)substituted acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid must be positioned next to a terminal methyl group in order to obtain satisfactory yields. Prior applications, Serial Nos. 464,607 and 489,300, filed October 25, 1954, and February 18, 1955, respectively, disclose a number of illustrative compounds suitable for use as the aryloxy-substituted acid, and methods of preparing the same. These materials, which are referred to for convenience by the trademarks of S. C. Johnson & Son, Inc. as Diphenolic Acid or DPA, consist of the condensation products of levulinic acid and phenol, substituted phenols, or mixtures thereof. It has been found that the phenolic nuclei of the Diphenolic Acid may be substituted with any group which will not interfere with the reactions contemplated. For example, the nuclei may be alkylated with alkyl substitutents containing from 1–5 carbon atoms as disclosed in Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility and water resistance. However, the unsubstituted product is usually more readily purified.

The synthetic tricarboxylic acids can be prepared from the above described Diphenolic Acid through reaction with substituted acids which contain up to about 8 carbon atoms and a single functional group which is capable of reacting with phenolic hydroxyl groups to form an ether. One type of compound is a monohalo acid. With this type, the reaction is carried out in an alkaline medium with enough alkali present to neutralize the carboxyl groups of both the Diphenolic Acid, the substituted mono acids, and to form an alkali metal phenoxide with the phenolic hydroxyl groups of the Diphenolic Acid. Under these conditions, the alkali phenoxide will react with the monohalo acid to form an ether linkage. The generic reaction between the Diphenolic Acid contemplated herein and the substituted acids containing up to about 8 carbon atoms, proceeding through the well-known Williamson ether synthesis, may be illustrated by the following formula:

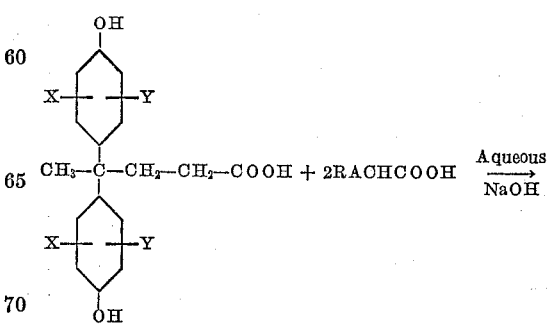

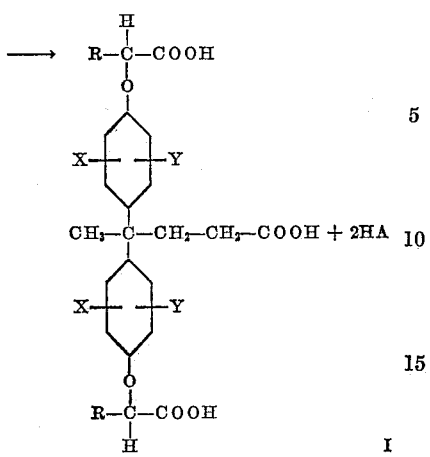

In the above formula, X and Y are either hydrogen or an alkyl group having from 1–5 carbon atoms, R is hydrogen and an alkyl group having from 1–6 carbon atoms, and A is a functional group capable of reacting with phenolic hydroxyl groups to form an ether. Where 4,4-bis(4,hydroxyphenyl) pentanoic acid and monochloroacetic acid are employed as the specific reactants in the above reaction, the formula becomes

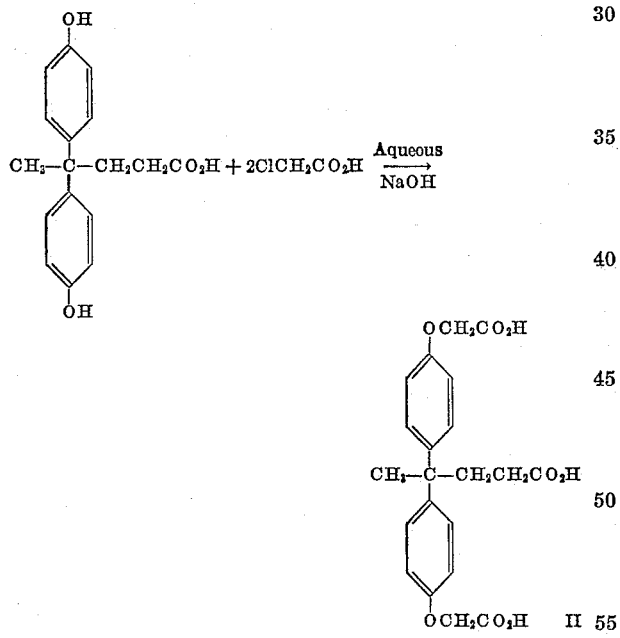

Although the reactions are usually carried out in an aqueous alkali solution and the resulting tricarboxylic acid precipitated by acidification at the end of the reaction period, some caution must be used in removing the salt by water washing because of appreciable water solubility of the tricarboxylic acid itself. This purification may, however, be carried out by careful washing with warm water. It may sometimes be desirable to conduct the reaction in the presence of organic solvents or a mixture of an organic solvent and water. Temperatures suitable for the reaction are in the range of about 65–110° C.

The substituted acids used in preparing the instant tricarboxylic acids include aliphatic monohalo acids in which the halogen group is attached to a carbon of the alkyl chain. The α-monochloro compounds are usually preferred due to their greater commercial availability and since they readily react in a Williamson ether synthesis with fewer side products being formed. The β- and γ-halo acids, for example, tend to dehydrohalogenate in the presence of alkali phenoxides to give the corresponding unsaturated aliphatic acids, thereby reducing the yield of the desired tricarboxylic acid. In the case of omega-halo acids the halogen group is less reactive and again the side reaction of dehydrohalogenation results in somewhat lower yields than are obtained from the corresponding α-halogen acids. Compounds which are illustrative and particularly advantageous in reactions with the Diphenolic Acid to give the subject tricarboxylic acids are chloroacetic acid and α-chloropropionic acid. Other exemplary acids are 2-chlorocaprylic and 2,bromovaleric acids. Epoxy acids such as the glycidic acid, 6,7-epoxy-heptanoic acid may also be used, but from an industrial standpoint the monohalo acids are preferred. If an epoxy acid were used, the epoxy group would react directly with the hydroxyl group thereby avoiding the formation of the alkali phenoxide.

Examples I and II illustrate the preparation of tricarboxylic acids by the reaction of Diphenolic Acid with halo aliphatic organic acids. The quantities of materials given are parts by weight unless otherwise indicated.

EXAMPLE I

In a flask provided with a mechanical stirrer, thermometer, and reflux condenser was placed a solution of 143 parts of 4,4-bis(4-hydroxyphenyl)pentanoic acid and 80 parts of NaOH in 200 parts of water. This mixture was brought to reflux and a solution of 142 parts of chloroacetic acid in 200 parts of water containing 61 parts of NaOH below 25° C. was added. The continuously agitated reaction mixture was held at 90–95° C. for 1¼ hours, then cooled to 80° C. Sufficient aqueous HCl was then added to lower the pH to 1. The aqueous layer was decanted and the resinous product washed 4 times with warm water, followed by decantation each time. The residue was dried by heating to 130° C. to give 160 parts of a tacky product having an acid value of 383 (theoretical—418).

The crude tricarboxylic acid was purified by recrystallization from water. The acid is quite soluble in hot water but precipitates out in a noncrystalline form except from dilute solutions. Two crystalline forms of the acid were obtained on recrystallization from water. One form melted at 144.5–145.5° C., had an acid value of 418, and the following elemental analysis. Calculated: C, 62.68; H, 5.47. Found: C, 62.1; H, 5.41. The second form melted at 172–173° C. and had an acid value of 418.

EXAMPLE II

In a procedure similar to that used in Example I, 163 parts of α-chloropropionic acid and 143 parts of 4,4-bis(4-hydroxyphenyl)pentanoic acid were reacted in the presence of aqueous NaOH to yield 145 parts of a resinous polybasic acid having an acid value of 345 (theoretical 391).

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated at III to V below where $n$ equals zero. Preparation of these epoxide materials as well as illustrative examples are described in U.S. Patents, 2,456,408, 2,503,726, 2,615,007, 2,615,008, 2,688,805, 2,668,807 and 2,698,315. Well known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin $\xrightarrow[\text{alkali}]{\text{aqueous}}$

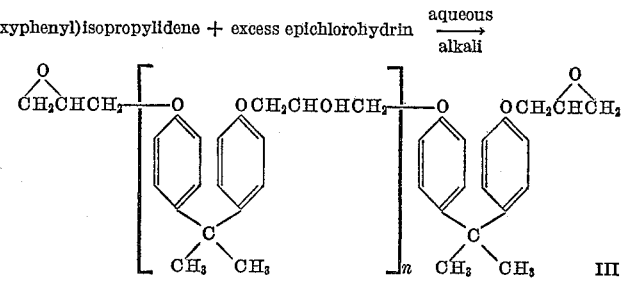

III

Polyhydric phenol and a polyepoxide bis(hydroxyphenyl)isopropylidene + excess butylene dioxide $\xrightarrow{\text{heat}}$

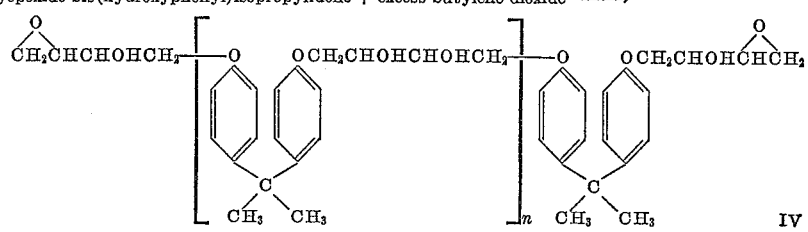

IV

Polyhydric phenol and a polyhalohydrin bis(hydroxyphenyl)isopropylidene + excess α-glycerol dichlorohydrin $\xrightarrow[\text{alkali}]{\text{aqueous}}$

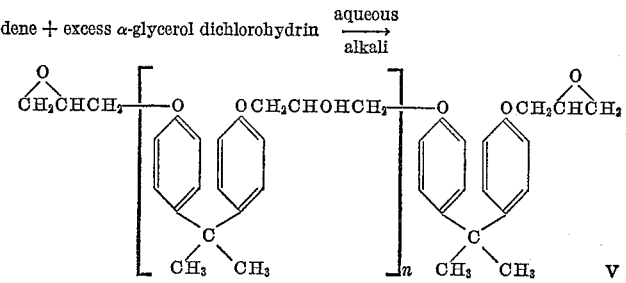

V

As used in the above formulas, $n$ indicates the degree of polymerization, and its value depends on the molar ratio of reactants. As can be seen from these formulas, the complex epoxide resins used in this invention contain terminal epoxide groups, and alcoholic hydroxyl groups attached to the aliphatic portions of the resin, the latter being formed by the splitting of epoxide groups in the reaction of the same with phenolic hydroxyl groups. Ultimately the reaction with the phenolic hydroxyl groups of the polyhydric phenols is accomplished by means of epoxide groups formed from halohydrins by the loss of hydrogen and halogen generally as shown by the following equation:

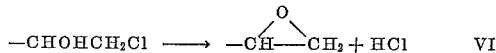      VI

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long-chain aliphatic acid esters containing from about 15 to 22 carbon atoms. These acids may be esterified by simple monohydric alcohols such as methyl, ethyl or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain from more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid, and a catalytic material, such as sulfuric acid. More recently epoxidation methods have consisted or replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion.

This reaction may be carried out so as to give higher polymers. Other aliphatic polyepoxides useful in this invention may be illustrated by the poly(epoxyalkyl) ethers derived from polyhydric alcohols. These materials may in general be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

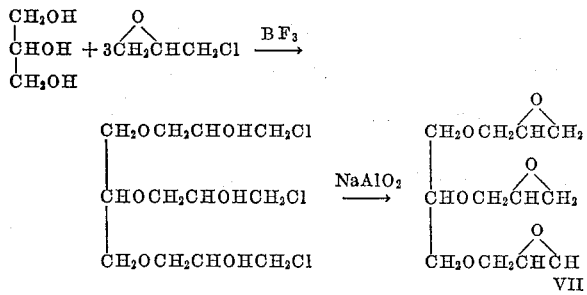

VII

It is to be understood that such reactions do not give pure compounds, and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive, and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following, a description or an illustration of the preparations of the various types of polyepoxides used in the instant invention is given. Portions are again expressed as parts by weight unless otherwise indicated.

The complex resinous polyepoxides used in examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)-isopropylidene with a molar excess of epichlorohydrin in varying amounts.

| Epon Resin Type | Melting Point, °C. | Viscosity [1] (Gardner-Holdt) | Epoxide Equivalent | Average Molecular Weight |
|---|---|---|---|---|
| Epon 864 | 40–45 | A–B | 325 | 450 |
| Epon 1001 | 64–76 | C–G | 480 | 640 |
| Epon 1004 | 95–105 | Q–U | 870 | 1,133 |
| Epon 1007 | 127–133 | Y–Z$_1$ | 1,750 | |

[1] Based on 40 percent nonvolatile in butyl carbitol at 25° C.

Examples III through V describe the preparation of typical polyepoxide polyesters.

EXAMPLE III

*Preparation of polyester from tetrahydrophthalic anhydride and ethylene glycol*

In a 3-neck flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-neck flask provided with a thermometer, a mechanical agitator, and a reflux condenser was placed 107 parts of the dehydrated acid form of a cation exchange resin (Dowex 50X–8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyrighted 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 4.2. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula RR'$_3$N$^+$OH$^-$ where R represents the styrene-divinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE IV

Following the procedure of Example III, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE V

The process of Example III was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples VI and VII describe the preparation of epoxidized vegetable oil acid esters.

EXAMPLE VI

*Epoxidized soya bean oil acid modified alkyd resin* a. PREPARATION OF ALKYD RESIN

To a kettle provided with a condenser was added 290 parts of white refined soya bean oil. While bubbling a continuous stream of nitrogen through this oil, the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 1 part of the product and 2½ parts of methyl alcohol showed no insolubility (about 15 minutes). At this point 136 parts of phthalic anhydride was added and the temperature gradually raised to 250° C. and held at this temperature for 30 minutes. At this point the condenser was removed from the kettle and the pressure reduced somewhat by attaching to a water aspirator evacuating system. With continuous agitation the mixture was then held at 250° C. until the acid value had reached 10.5. At this point the resin was thinned with xylene to 48% nonvolatile content having a viscosity of H (Gardner bubble viscosimeter).

b. EPOXIDATION OF A SOYA BEAN OIL ACID MODIFIED ALKYD RESIN

In a 3-neck flask provided with a thermometer, a mechanical agitator and a reflux condenser was placed 70 parts of dehydrated acid form of a cation exchange resin (Dowex 50X-8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution was thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE VII

*Epoxidized soya bean oil*

Admex 710, an epoxidized soya bean oil having an equivalent weight to an epoxide of 263, was dissolved in methyl ethyl ketone to a nonvolatile content of 50%. Admex 710, a product of the Archer-Daniels-Midland Company has an acid value of 1, a viscosity of 3.3 stokes at 25° C. and an average molecular weight of 937.

Examples VIII and IX describe the preparation of simple aliphatic polyepoxides.

EXAMPLE VIII

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature the inorganic material was removed by filtration. The dioxane and low boiling products were removed by heating the filtrate to 205° C. at 20 mm. pressure to give 260 parts of a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE IX

In a 3-neck flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418 and equivalent weight to epoxide content of 198, the yield amounting to 250 parts.

Two general classes of aldehyde condensates are contemplated for preparing the products of this invention, those prepared from ammonia derivatives and those derived from phenols, the choice being dependent on the end uses and characteristics desired. For instance, if the end use were to be a white enamel, the ammonia derivative-aldehyde condensates would probably be chosen because of their extremely light initial color and their good color retention, the phenols are somewhat darker in color and have a tendency to yellow upon aging. For the most desirable non-polar solvent solubility, the phenolaldehyde condensates would be the proper choice since the ammonia derivative-aldehyde condensates usually require some butanol and xylol present to give the desirable solubility. For certain applications, the butanol odor is objectionable and at times incompatible with the resin with which it is used. Adhesion to metals also appears to be better in the phenol aldehyde condensates. From an economic standpoint, the phenol-aldehyde condensates are lower in price, but in some applications where exceptional performance is more important than low cost, such as in white enamels, the ammonia derivatives would be better suited. The aldehyde-ammonia derivative condensation products are formed by the reaction of aldehydes with amines or amides such as urea, thiourea, and their derivatives, melamines and sulfonamides. It is well known that various amines and amides will react with formaldehyde to form aldehyde-amine or aldehyde-amide condensates. A number of derivatives of the amines and amides mentioned are also contemplated herein. Exemplary derivatives are the substituted urea, thioureas, or melamines such as the long-chain alkyl substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate, and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, cross-linked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative, in order to be suitable for condensation with an aldehyde must contain at least one hydrogen atom attached to the nitrogen atom. Fusible materials of varying degrees of condensation may be used with the epoxides and the tricarboxylic acids to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the tricarboxylic acid composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the resinous tricarboxylic acids according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve epoxide and the tricarboxylic acid. Solutions prepared in this manner can be applied as a coating and the solvent subsequently evaporated before the main reaction between the epoxide, tricarboxylic acid, and condensate takes place.

Examples X to XIV inclusive describe the preparation of ammonia derivative-aldehyde condensates.

EXAMPLE X

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE XI

The procedure of preparation including the water removal was the same as that used in Example X. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE XII

The procedure of preparation including the removal of water was the same as that used in Example X. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

EXAMPLE XIII

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amouning to 1342 parts was a clear, water white, heavy, syrupy liquid.

EXAMPLE XIV

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water white resinous solid.

The second class of condensates suitable for use in making the compositions herein described are those which contain reactive phenolic hydroxyl groups, formed by the reaction of phenols and aldehydes. Phenol and formaldehyde react to form a variety of reaction products, depending upon the proportions and conditions of reaction. These include products such as phenol alcohols having both phenolic and alcholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions, that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and tricarboxylic acids for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and tricarboxylic acids or with the two reactants in a solvent used as a reaction medium. The phenol-aldehyde condensate which is essentially a polymethylol phenol rather than a polymer may be used in the preparation of the new phenol-aldehyde, polyepoxide, tricarboxylic acid condensation products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and tricarboxylic acids and reacted therewith to form the products of this invention.

In selecting a phenol-aldehyde condensate one may choose either the heat-converting or the permanently fusible type. For example, the formaldehyde reaction products of such phenols as carbolic acid, resorcinol, and bis-(4-hydroxyphenyl) isopropylidene readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the tricarboxylic acids described.

Examples XV to XVII, inclusive, describe the preparation of phenol-aldehyde condensates which are used in combination with the polyepoxides and the tricarboxylic acids to form the products herein described.

EXAMPLE XV

*Condensation of bisphenol [bis(para-hydroxyphenyl) isopropylidene] with formaldehyde*

In a 3-liter, 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three time with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

EXAMPLE XVI

*Reaction of p-tertiary butylphenol with formaldehyde*

The procedure of preparation, including the dehydration step, was the same as that used in Example XV. A mixture of 1000 parts of p-tertbutylphenol, 1067 parts of 37% aqueous formaldehyde, and 10 parts of sodium hydroxide was used to give a final yield of 1470 parts of a clear, almost colorless syrupy product.

EXAMPLE XVII

*Reaction of phenol with formaldehyde*

Again a reaction procedure including the dehydration step was the same as that used in Example XV. A mixture of 658 parts of phenol, 1400 parts of 37% aqueous formaldehyde, and 6.6 parts of sodium hydroxide was used to give a final yield of 1168 parts of a clear, syrupy product.

The tricarboxylic acids which are used in this invention have excellent potential in the manufacture of protective coatings, plastics, and other polymeric structures. Their potential in these fields is largely due to their configuration which allows reaction with alcohols, amines, epoxides, etc. with negligible stearic hindrance. In addition the carboxyl groups are arranged so that they do not exert activating or deactivating influence upon one another, thus providing desirably stable compounds. Since many of the reactions of high molecular weight acids are conducted at temperatures ranging between 150–275° C. such stability is necessary. The combination of aliphatic and aromatic character as well as the symmetry of the acids give added value in their utility in polymeric structures.

The subject tricarboxylic acids have been found to be particularly advantageous as coreactants with polyepoxides in forming valuable infusible, insoluble materials for use in protective coatings, molding resins, and adhesives. In the formulation of insoluble, infusible heat conversion products from polyepoxides, one of the problems encountered is that of choosing satisfactory coreactants to couple with the epoxide groups to give the desired crosslinking required and the desired properties to the final product. Ingredients which have been found to inter-react with polyepoxide compositions include certain dicarboxylic acids which contain active hydrogens attached to the carboxyl groups.

The presently described tricarboxylic acids, containing within the same molecule 3 carboxyl groups and a chemical structure which is readily miscible with the commercial polyepoxide resins, has been found to give particularly valuable products when reacted with these epoxides. The chemical structure of the tricarboxylic acids is such that they not only furnish trifunctionality in reaction with the polyepoxides, but they contribute to the resinous character of the resulting products because of the aromatic nuclei. These carboxylic acids, for example, contribute greatly to the hardness, toughness, gloss, and chemical resistance of the co-converted mixtures with the epoxies.

The tricarboxylic acid and polyepoxide compositions, while possessing excellent properties can still be enhanced for certain applications by modifications with phenol-aldehyde or ammonia derivative-aldehyde condensates. The aldehyde condensates, depending on the choice, serve to impart added toughness, faster conversion and in many instances increased flexibility and chemical resistance as well as improved adhesion.

The reaction between the epoxides and the tricarboxylic acids or between the epoxides, the aldehyde condensates, and the tricarboxylic acids herein described is effected by heating a mixture of the same at elevated temperatures, usually in the range of 100–200° C. Usually the addition of a catalyst is unnecessary, however, in certain instances it may be desirable to use small amounts of catalyst, such as the boron trifluoride adducts, sodium phenoxides, sodium salts of the tricarboxylic acids, or sodium salts of the phenol-aldehyde condensates.

The mixtures of epoxides and tricarboxylic acids, or of epoxides, aldehyde condensates, and tricarboxylic acids are of utility at initial or varying intermediate stages of the reaction. Thus initial or intermediate reaction products which are soluble in common solvents may be blended in solution in proper concentration and the solutions then used as a coating or impregnant for fabrics or paper, or for the formation of protective coating films. Heat may be then applied to remove the solvent and bring about polymerization to the insoluble, infusible state. In certain instances, as for molding compositions, the initial mixtures or intermediate reaction products of the two or three types of reactants described may be used without a solvent, giving directly a composite which on the application of heat converts to a final infusible product.

In making the new compositions and products herein described, the epoxides and tricarboxylic acids or the epoxides, the aldehyde condensates, and the tricarboxylic acids may be used with each other in regulated proportions without the addition of other materials. However, for certain end uses, additional ingredients are often advantageously employed including filling and compound materials, pigments, etc. For the compositions which tend to give somewhat brittle products on heat conversion to the insoluble, infusible state, plasticizers may be added. However, in most instances it is possible to regulate the proportions of the two or three types of reacting ingredients so as to obtain products of suitable flexibility, obviating the necessity for plasticizers.

The polymerization of mixtures of epoxide, aldehyde condensate, and tricarboxylic acid may involve several chemical reactions. It will be appreciated that the reactions involved are very complex and the extent to which each takes place will vary with the temperature and time of heat treatment and with the nature of the three reactants employed. While it is not intended to be limited by any theoretical explanation of the exact nature of these reactions, it seems probable that conversion to the final polymeric products by reaction between the reactants described involves direct polymerization of the epoxide groups inter se; aldehyde condensation: reaction of epoxide groups with active hydrogen-containing groups such as alcoholic hydroxyl groups, phenolic hydroxyl groups, and carboxyl groups; and esterification of the carboxyl groups of the tricarboxylic acids with alcoholic hydroxyl groups and phenolic hydroxyl groups, all of which take place to some extent simultaneously in forming the final products.

The present invention provides a wide range of reaction compositions and products, including initial mixtures of the aforesaid epoxides, phenol-aldehyde condensates, and polycarboxylic acids, their partial or intermediate reaction products, and compositions containing such intermediate reaction products as well as final reaction products. In general, the initial mixtures, as well as the intermediate reaction products, unless too highly polymerized, are soluble in organic solvents of the type used in lacquers, such as ketone and ester solvents.

In addition to having outstanding physical properties, such as hardness, toughness, and flexibility, the final infusible, insoluble products have outstanding chemical properties, such as high resistance to oxidation, water, alkali, acids, and organic solvents. It has also been observed that the final conversion products possess unusually good adhesion to most surfaces including metal, glass, wood, and plastics. It is this physical property of outstanding adhesion to a wide variety of surfaces which gives the subject products high potential value for use in formulating adhesives. The superior adhesion to surfaces is also of extreme value in formulating protective coating films for use on many types of surfaces. The adhesion characteristics are probably due to the fact that even in the converted, infusible state the compositions contain a high percentage of highly polar groups, such as alcoholic hydroxyl groups, ether groups, and phenolic hydroxyl groups. Despite the high percentage of polar groups in the insoluble, infusible products of this invention, tolerance for water is unusually low, apparently due to the high molecular weight and the rigid crosslinked structure of the final composition.

Proportions of the tricarboxylic acid, polyepoxides, and aldehyde condensates can be varied widely depending upon the composition and utility desired. The preferred ratios of tricarboxylic acid to epoxide are 2:1 to 1:2. These proportions, expressed on an equivalent basis, provide the best over-all characteristics. In some instances, it may be desirable to use more of the polyepoxide in relation to the acid or more of the acid in relation to the epoxide, but in such instances some of the desired characteristics are usually lost. For example, if a large amount of acid is employed, the alkali resistance is usually damaged since the alkali will react with the free carboxyl groups. Such compositions can be used to advantage if alkali resistance is not a major factor. When the aldehyde condensates are used to modify compositions, they can be used in an amount up to about 70%, on a weight basis, of the composition, depending on the characteristics of the ingredients and the desired end product. Usually the aldehyde condensate will serve to accelerate the conversion and to harden the film with the optimum results being obtained at 10–20%. Equivalents, as expressed here, refer to the weight of the acid per carboxyl group in the case of the acid and to the weight of the epoxide per epoxide group in the case of the polyepoxides.

Examples XVIII through LXXXIX, inclusive, illustrate the conversion to insoluble protective coatings of combinations of the polyepoxides and tricarboxylic acids, and such compositions modified with aldehyde condensates. For these preparations the ingredients were dissolved in suitable solvents at 40–50% nonvolatile. The tricarboxylic acids were dissolved in methyl ethyl ketone at 50% nonvolatile as were the resinous complex polyepoxides and simple aliphatic polyepoxides. The epoxidized polyesters and epoxidized natural oils were dissolved in xylene. The aldehyde condensates were dissolved in a mixture of methyl ethyl ketone and butanol. Admixtures of these solutions were prepared and films .002″ wet thickness were spread on glass panels and heat converted 30 minutes at 170° C. The admixtures were stable at room temperature for periods ranging from 5 days to longer than 2 months. Proportions hereinafter expressed refer to parts by weight and are based on nonvolatile content of the solution of reactants.

It should be appreciated that while there are above disclosed but a limited number of embodiments of the product and process of the invention herein presented, it is possible to produce still other embodiments without departing from the inventive concept herein disclosed.

| Example No. | Parts of Polyepoxide | Parts of Tribasic Acid | Parts of Aldehyde Condensate | Film Resistance Boiling Water | Film Resistance 5% Aqueous NaOH at 25° C. |
| --- | --- | --- | --- | --- | --- |
| XVIII | 16.8, Epon 1001 | 5.0, Ex. I | | 30/60 hrs | 72 hrs. |
| XIX | 8.4, Epon 1001 | 5.0, Ex. I | | 8 hrs | 4 hrs. |
| XX | 15.5, Epon 1004 | 5.0, Ex. I | | 8 hrs | 8 hrs. |
| XXI | 31.0, Epon 1004 | 2.5, Ex. I | | 6 hrs | 50+ hrs. |
| XXII | 11.7, Epon 864 | 5.0, Ex. I | | 8 hrs | 30 hrs. |
| XXIII | 5.9, Epon 864 | 5.0, Ex. I | | 8 hrs | ½ hr. |
| XXIV | 31.0, Epon 1007 | 5.0, Ex. I | | 5/60 hrs | 168 hrs. |
| XXV | 14.9, Epon 1001 | 5.0, Ex. II | | 30/60 hrs | 168 hrs. |
| XXVI | 16.8, Epon 1001 | 2.5, Ex. I | | 8 hrs | 50+ hrs. |
| XXVII | 7.4, Epon 1001 | 5.0, Ex. II | | 6 hrs | 6 hrs. |
| XXVIII | 14.9, Epon 1001 | 2.5, Ex. II | | 16+ hrs | 2½ hrs. |
| XXIX | 8.4, Epon 1001 | 5.0, Ex. I | 1.3, Ex. XVII | 8 hrs | 6 hrs. |
| XXX | 31.0, Epon 1007 | 5.0, Ex. I | 3.6, Ex. XV | 10/60 hrs | 168 hrs. |
| XXXI | 11.7, Epon 864 | 5.0, Ex. I | 1.7, Ex. XVI | 8 hrs | 168 hrs. |
| XXXII | 14.8, Epon 1001 | 5.0, Ex. II | 2.0, Ex. XVI | 7 hrs | 168 hrs. |
| XXXIII | 16.8, Epon 1001 | 5.0, Ex. I | 21.8, Ex. XVI | 16+ hrs | 168 hrs. |
| XXXIV | 31.0, Epon 1004 | 5.0, Ex. I | 45.0, Ex. XVI | 16+ hrs | 2½ hrs. |
| XXXV | 16.8, Epon 1001 | 5.0, Ex. I | 2.2, Ex. XII | 8 hrs | 72 hrs. |
| XXXVI | 8.4, Epon 1001 | 5.0, Ex. I | 1.3, Ex. XI | 40/60 hrs | 2¾ hrs. |
| XXXVII | 31.0, Epon 1004 | 5.0, Ex. I | 3.6, Ex. X | 5-30/60 hrs | 168 hrs. |
| XXXVIII | 31.0, Epon 1007 | 5.0, Ex. I | 3.6, Ex. XIII | 10/60 hrs | 168 hrs. |
| XXXIX | 15.5, Epon 1004 | 5.0, Ex. I | 2.1, Ex. XIV | 8 hrs | 10 hrs. |
| XL | 14.8, Epon 1001 | 5.0, Ex. II | 2.0, Ex. XII | 7 hrs | 168 hrs. |
| XLI | 10.0, Ex. III | 5.0, Ex. I | | 8 hrs | |
| XLII | 5.8, Ex. IV | 5.0, Ex. I | | 8 hrs | |
| XLIII | 11.5, Ex. IV | 5.0, Ex. I | | 8 hrs | |
| XLIV | 9.5, Ex. V | 5.0, Ex. I | | 8 hrs | |
| XLV | 4.8, Ex. V | 5.0, Ex. I | | 8 hrs | |
| XLVI | 5.7, Ex. IV | 5.0, Ex. II | | 2 hrs | |
| XLVII | 10.0, Ex. III | 5.0, Ex. I | 1.5, Ex. XVII | 8 hrs | |
| XLVIII | 5.8, Ex. IV | 5.0, Ex. I | 1.1, Ex. XV | 8 hrs | |
| XLIX | 9.5, Ex. V | 5.0, Ex. I | 1.4, Ex. XVI | 8 hrs | |
| L | 5.1, Ex. IV | 2.5, Ex. II | 0.8, Ex. XVI | 7 hrs | |
| LI | 10.0, Ex. III | 5.0, Ex. I | 1.5, Ex. XII | 8 hrs | |
| LII | 11.5, Ex. IV | 5.0, Ex. I | 1.7, Ex. XI | 8 hrs | |
| LIII | 5.8, Ex. IV | 5.0, Ex. I | 1.1, Ex. X | 8 hrs | |
| LIV | 9.5, Ex. V | 5.0, Ex. I | 1.4, Ex. XIII | 8 hrs | |
| LV | 4.8, Ex. V | 5.0, Ex. I | 1.0, Ex. XIV | 8 hrs | |
| LVI | 5.1, Ex. IV | 5.0, Ex. II | 0.8, Ex. XII | 7 hrs | |
| LVII | 5.3, Ex. VIII | 5.0, Ex. I | | 8 hrs | 10 min. |
| LVIII | 2.6, Ex. VIII | 5.0, Ex. I | | 8 hrs | 10 min. |
| LIX | 7.1, Ex. IX | 5.0, Ex. I | | 8 hrs | 8 hrs. |
| LX | 3.5, Ex. IX | 5.0, Ex. I | | 8 hrs | 2 hrs. |
| LXI | 5.3, Ex. VIII | 2.5, Ex. I | | | 6 hrs. |
| LXII | 4.7, Ex. VIII | 5.0, Ex. II | | 3 hrs | 10 min. |
| LXIII | 2.3, Ex. VIII | 5.0, Ex. II | | 3½ hrs | 10 min. |
| LXIV | 4.7, Ex. VIII | 2.5, Ex. II | | | |
| LXV | 5.3, Ex. VIII | 5.0, Ex. I | 1.0, Ex. XVII | 8 hrs | 15 min. |
| LXVI | 2.6, Ex. VIII | 5.0, Ex. I | 0.8, Ex. XV | 8 hrs | 15 min. |
| LXVII | 7.1, Ex. IX | 5.0, Ex. I | 1.2, Ex. XVI | 8 hrs | 15 min. |
| LXVIII | 4.6, Ex. II | 5.0, Ex. II | 1.0, Ex. XVI | 7 hrs | 15 min. |
| LXIX | 5.3, Ex. VIII | 5.0, Ex. I | 25.0, Ex. XVI | 16+ hrs | 1 hr. |
| LXX | 5.3, Ex. VIII | 5.0, Ex. I | 1.0, Ex. XII | 8 hrs | 15 min. |
| LXXI | 2.6, Ex. VIII | 5.0, Ex. I | 0.8, Ex. XI | 8 hrs | 15 min. |
| LXXII | 7.1, Ex. IX | 5.0, Ex. I | 1.2, Ex. X | 8 hrs | 1 hr., 15 min. |
| LXXIII | 3.5, Ex. IX | 5.0, Ex. I | 0.9, Ex. XIII | 8 hrs | 15 min. |
| LXXIV | 3.5, Ex. IX | 5.0, Ex. I | 0.9, Ex. XIV | 5½ hrs | 15 min. |
| LXXV | 4.6, Ex. VIII | 5.0, Ex. II | 1.0, Ex. XII | 7 hrs | 15 min. |
| LXXVI | 17.3, Ex. VI | 5.0, Ex. I | | 8 hrs | 30 hrs. |
| LXXVII | 8.6, Ex. VI | 5.0, Ex. I | | 3 hrs | 10 min. |
| LXXVIII | 9.2, Ex. VII | 5.0, Ex. I | | 8 hrs | 10 min. |
| LXXIX | 8.1, Ex. VII | 5.0, Ex. II | | 1 hr | 30 min. |
| LXXX | 17.3, Ex. VI | 5.0, Ex. I | 2.2, Ex. XVII | 3 hrs | 10 hrs. |
| LXXXI | 8.6, Ex. VI | 5.0, Ex. I | 1.3, Ex. XV | 3 hrs | 15 min. |
| LXXXII | 9.2, Ex. VII | 5.0, Ex. I | 1.4, Ex. XVI | 10 min | 3 hrs. |
| LXXXIII | 8.1, Ex. VII | 5.0, Ex. II | 1.4, Ex. XVI | 20 min | 3 hrs. |
| LXXXIV | 17.3, Ex. VI | 5.0, Ex. I | 2.2, Ex. XII | 1 hr | 1 hr. |
| LXXXV | 8.6, Ex. VI | 5.0, Ex. I | 1.4, Ex. XI | 1 hr | 15 min. |
| LXXXVI | 9.2, Ex. VII | 5.0, Ex. I | 1.4, Ex. X | 8 hrs | 15 min. |
| LXXXVII | 17.3, Ex. VI | 5.0, Ex. I | 2.2, Ex. XIII | 8 hrs | 25 min. |
| LXXXVIII | 9.2, Ex. VII | 5.0, Ex. I | 1.4, Ex. XIV | 8 hrs | 15 min. |
| LXXXIX | 8.1 Ex. VII | 5.0, Ex. II | 1.4, Ex. XII | 7 hrs | 45 min. |

It is claimed and desired to secure by Letters Patent:

1. A composition of matter obtained by heating a mixture consisting essentially of (A) a compound having the formula:

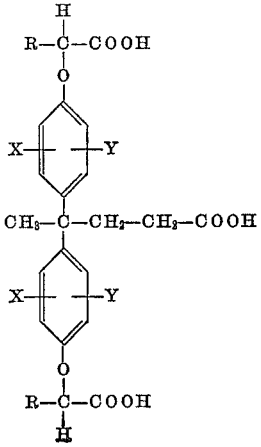

where R is selected from the group consisting of hydrogen and alkyl groups having from 1–6 carbon atoms and X and Y are selected from the group consisting of hydrogen and alkyl groups of from 1–5 carbon atoms, and (B) an organic polyepoxide containing an average of more than one oxirane group and being free of groups reactive with said compound (A) other than hydroxyl, carboxyl and oxirane.

2. The composition of claim 1 wherein R is hydrogen.

3. The composition of claim 1 wherein R is methyl.

4. The composition of claim 1 wherein the polyepoxide (B) is a complex resinous epoxide which is a polymeric polyhydric alcohol having alternating aliphatic chains and aromatic nuclei united through ether oxygen and terminating in oxirane substituted aliphatic chains.

5. The composition of claim 1 wherein the polyepoxide (B) is an epoxidized polyester of tetrahydrophthalic acid and a glycol, wherein the epoxy oxygen atoms are each linked to adjacent carbon atoms in the nucleus of said acid.

6. The composition of claim 1 wherein the polyepoxide (B) is a polyfunctional epoxidized ester of an ethylenically unsaturated natural fatty oil acid containing about 15–22 carbon atoms and being free of groups reactive with said compound (A) other than oxirane hydroxyl groups.

7. A composition of matter obtained by heating a mixture consisting essentially of (A) a compound having the formula:

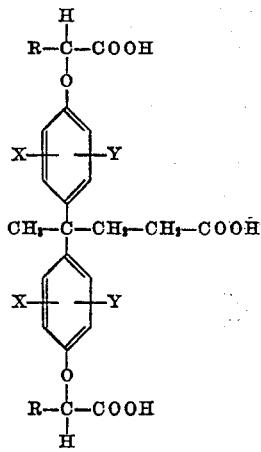

where R is selected from the group consisting of hydrogen and alkyl groups having from 1–6 carbon atoms and X and Y are selected from the group consisting of hydrogen and alkyl groups of from 1–5 carbon atoms, (B) up to about 70% by weight of a fusible condensation product of formaldehyde and at least one member of the group consisting of urea, thiourea, melamine, toluene sulfonamide, alkyl derivatives thereof, and phenols; and (C) an organic polyepoxide containing an average of more than one oxirane group and being free of groups reactive with said compound (A) and product (B) other than hydroxyl, carboxyl and oxirane.

8. The composition of claim 7 wherein said condensate (B) is a phenol-formaldehyde condensate and is present in the amount of 10% by weight.

9. The composition of claim 7 wherein said condensate (B) is a urea-formaldehyde condensate and is present in the amount of 10% by weight.

10. The composition of claim 7 wherein said condensate (B) is a melamine-formaldehyde condensate and is present in the amount of 10% by weight.

References Cited in the file of this patent

UNITED STATES PATENTS 2,712,535   Fisch _____ July 5, 1955

OTHER REFERENCES

"Epon Resins—New Film Formers," Paint, Oil and Chemical Review, November 9, 1950, page 17.

Marmion: "Epoxide Resins," Research (London), volume 7, 1954, page 352.

Schildknecht: "Polymer Processes," Interscience Publishers, Inc., New York, February 28, 1956, pages 444–447.

UNITED STATES PATENT OFFICE
CERTIFICATE OF CORRECTION

Patent No. 2,893,966                                                                          July 7, 1959

Sylvan O. Greenlee

It is hereby certified that error appears in the printed specification of the above numbered patent requiring correction and that the said Letters Patent should read as corrected below.

Column 6, line 68, for "consisted or" read -- consisted of --; column 7, lines 16 to 24, the triepoxide in equation VII, should appear as shown below instead of as in the patent:

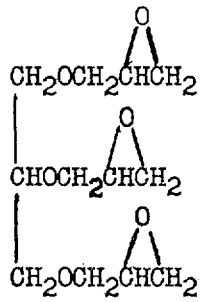

column 12, line 60, Example XIII, for "amouning" read -- amounting --.

Signed and sealed this 17th day of May 1960.

(SEAL)
Attest:

KARL H. AXLINE                                                 ROBERT C. WATSON
Attesting Officer                                            Commissioner of Patents